US007328357B2

(12) United States Patent
Terai

(10) Patent No.: US 7,328,357 B2
(45) Date of Patent: Feb. 5, 2008

(54) ELECTRONIC APPARATUS WITH SWITCHING POWER SUPPLY CONTROLLED TO STOP MAIN CIRCUIT VOLTAGE AND REDUCE MICROCOMPUTER VOLTAGE DURING STANDBY MODE

(75) Inventor: Hiroshi Terai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 366 days.

(21) Appl. No.: 10/995,243

(22) Filed: Nov. 24, 2004

(65) Prior Publication Data

US 2005/0138453 A1 Jun. 23, 2005

(30) Foreign Application Priority Data

Nov. 27, 2003 (JP) .......................... P.2003-397437

(51) Int. Cl.
*G06F 1/26* (2006.01)

(52) U.S. Cl. .................................... 713/320; 363/20.01

(58) Field of Classification Search ............ 363/21.01; 713/320

See application file for complete search history.

(56) References Cited

U.S. PATENT DOCUMENTS 5,920,466 A * 7/1999 Hirahara .................. 363/21.02
6,496,390 B2 * 12/2002 Yang ....................... 363/21.07
6,601,179 B1 * 7/2003 Jackson et al. ............. 713/322
2005/0094036 A1 * 5/2005 Tichelaar .................... 348/730

FOREIGN PATENT DOCUMENTS

| | | | |
|---|---|---|---|
| JP | 2000-14005 | A | 1/2000 |
| JP | 2000-125468 | A | 4/2000 |
| JP | 2001-359032 | | 12/2001 |
| WO | WO 00/77785 | A1 | 12/2000 |

* cited by examiner

*Primary Examiner*—Chun Cao
*Assistant Examiner*—Albert Wang
(74) *Attorney, Agent, or Firm*—Morgan, Lewis & Bockius LLP

(57) ABSTRACT

In a configuration in which supply of a first operating power source to a main circuit part is stopped at the time of shifting to a standby mode, at the time of shifting to the standby mode, a voltage of a second operating power source is lowered to a voltage which is lower than a voltage in an operating mode and is close to a lower limit of a voltage allowable range of an operating power source of a microcomputer.

4 Claims, 1 Drawing Sheet

ELECTRONIC APPARATUS WITH SWITCHING POWER SUPPLY CONTROLLED TO STOP MAIN CIRCUIT VOLTAGE AND REDUCE MICROCOMPUTER VOLTAGE DURING STANDBY MODE

BACKGROUND OF THE INVENTION

1. Field of the Invention

The present invention relates to an electronic apparatus such as a disk reproducing apparatus in which at the time of shifting to a standby mode, a voltage of an operating power source supplied to a microcomputer for control is rendered lower than a voltage at the time of an operating mode.

2. Description of the Related Art

Consumer-oriented equipment such as a DVD reproducing apparatus is configured so that instructions of power-on from a front panel or a remote controller can be accepted even at the time of shifting to a standby mode which is a power-off state. On the contrary, reduction in power consumption in the standby mode is desired. For this purpose, conventionally, in the case of shifting to the standby mode, an operating power source is supplied to a microcomputer for control and supply of the operating power source to other main circuit parts is stopped and thereby power consumption in the standby mode is reduced (first related art).

The following art is proposed (second related art). That is, in this art, a transformer on which two primary coils and two secondary coils are wound is provided. Also, a rectification smoothing output of one of the two secondary coils is used as an operating power source of a microcomputer and a rectification smoothing output of the other of the secondary coils is used as an operating power source of a main circuit part. Then, at the time of shifting to a standby mode, a power source is supplied to only the one side of the primary coils and supply of the power source to the other side of the primary coils is stopped. Also, a path of supply of the operating power source to the main circuit part is broken. Therefore, it is constructed so that even at the time when it shifts to the standby mode and power consumption of the secondary side reduces, reduction in conversion efficiency of the transformer is prevented and power consumption in the standby mode is reduced (for example, see JP-A-2000-14005).

The following art is proposed (third related art). That is, in this art, a transformer in which a tap is formed in a primary coil is provided. Then, it is constructed so that at the time of shifting to an operating mode, one path of a power source is connected to the tap and at the time of shifting to a standby mode, the one path is switched and connected to the side of an end terminal of the primary coil. In other words, it is constructed so that the number of windings of the primary coil in the standby mode becomes more than the number of windings of the primary coil in the operating mode. Because of this, a voltage generated in a secondary coil at the time of the standby mode becomes lower than a voltage generated in the secondary coil at the time of the operating mode. As a result of that, power consumption at the time of the standby mode of a main circuit part using a DC output obtained by rectifying and smoothing an output of the secondary coil as an operating power source is rendered lower than power consumption at the time of the operating mode. Also, at the time of shifting to the standby mode, power consumption of a constant voltage circuit for generating an operating power source for a microcomputer for control is also rendered lower than power consumption at the time of the operating mode (for example, see JP-A-2000-125468).

SUMMARY OF THE INVENTION

However, the following problem was caused even in the case of using the first related art. That is, with respect to power consumption at the time of shifting to the standby mode, it tends to desire further reduction. However, in only a stop of supply of the operating power source to other main circuit parts at the time of shifting to the standby mode, power consumption of the microcomputer causes a bottleneck and it becomes difficult to cope with the further reduction.

The second related art is an art of reducing power consumption in the standby mode by improving conversion efficiency of the transformer, so that the art is an art difficult to apply in the case of using a switching power source.

The third related art is an art of reducing power consumption of the main circuit part acting as a load by lowering a voltage generated in the secondary coil in the case of shifting to the standby mode. Also, in addition, power consumption of the constant voltage circuit for generating an operating power source for a microcomputer (power consumption of a power source circuit for a microcomputer) is reduced. However, with respect to power which the microcomputer itself consumes, it is configured to consume the same power as that at the time of the operating mode even at the time of the standby mode, so that the art is an art difficult to apply in the case of being to solve the problem caused in the first related art.

The invention is devised to solve the problems, and it is an object of the invention to provide a disk reproducing apparatus in which at the time of shifting to a standby mode, a voltage of an operating power source supplied to a microcomputer and a light receiving unit for receiving an infrared signal from a remote controller is rendered a voltage lower than a voltage at the time of an operating mode and thereby power consumption as to an apparatus in the standby mode can be reduced at a high ratio.

Also, an further object of the invention is to provide an electronic apparatus in which at the time of shifting to a standby mode, a voltage of an operating power source supplied to a microcomputer is rendered lower than a voltage at the time of an operating mode and power consumption of the microcomputer in the standby mode is reduced and thereby power consumption as to an apparatus in the standby mode can be reduced.

Another object is to provide an electronic apparatus in which a voltage supplied to a light receiving unit for receiving an infrared signal from a remote controller is rendered lower than a voltage at the time of an operating mode and power consumption of the light receiving unit in a standby mode is reduced and thereby power consumption as to an apparatus in the standby mode can be reduced further.

In order to solve the problems, a disk reproducing apparatus according to one embodiment of the invention is applied to a disk reproducing apparatus for stopping supply of a first operating power source to a disk reproducing part at the time of shifting to a standby mode, comprising a disk reproducing part for reproducing an optical disk and also outputting a video signal and an audio signal obtained by reproduction at the time of shifting to an operating mode, a microcomputer for controlling a shift from a standby mode to an operating mode in the case of instructing a shift to the operating mode in the standby mode which is a power-off state in a state of supplying a power source and also controlling an operation of the disk reproducing part in the operating mode, a light receiving unit for receiving an infrared signal sent from a remote controller and also outputting data indicated by the received infrared signal to the microcomputer, and a switching power source for generating a first operating power source used as an operating power source of the disk reproducing part and a second operating power source used as an operating power source of the microcomputer and the light receiving unit based on the power source. Then, at the time of shifting to the standby mode, a voltage of the second operating power source is lowered to a voltage which is lower than a voltage in the operating mode and is close to a lower limit of a common range of a voltage allowable range of the operating power source of the microcomputer and a voltage allowable range of the operating power source of the light receiving unit.

That is, power consumption of the light receiving unit and power consumption of the microcomputer in the standby mode reduce according to a ratio at which at least a voltage of the second operating power source lowers. Therefore, power consumption as to an apparatus in the standby mode reduces by the amount in which the power consumption of the light receiving unit and the power consumption of the microcomputer reduce.

An electronic apparatus according to another embodiment of the invention is applied to an electronic apparatus for stopping supply of a first operating power source to a main circuit part at the time of shifting to a standby mode, comprising a switching power source for generating a first operating power source and a second operating power source based on a primary side power source, a main circuit part for using the first operating power source as an operating power source and performing a predetermined operation at the time of shifting to an operating mode, and a microcomputer for using the second operating power source as an operating power source and controlling a shift from a standby mode to an operating mode in the case of instructing a shift to the operating mode in the standby mode which is a power-off state in a state of supplying the primary side power source and also controlling an operation of the main circuit part in the operating mode. Then, at the time of shifting to the standby mode, a voltage of the second operating power source is lowered to a voltage which is lower than a voltage in the operating mode and is close to a lower limit of a voltage allowable range of the operating power source of the microcomputer.

That is, power consumption of the microcomputer in the standby mode reduces according to a ratio at which at least a voltage of the second operating power source lowers. Therefore, power consumption as to an apparatus in the standby mode reduces.

Also, in addition to the configuration described above, it is applied to an electronic apparatus characterized in that there is provided a light receiving unit for receiving an infrared signal sent from a remote controller and also outputting data indicated by the received infrared signal to a microcomputer and the microcomputer starts supply of a first operating power source to a main circuit part when data outputted from the light receiving unit indicates a shift to an operating mode in a standby mode. Then, a second operating power source is supplied to the light receiving unit as an operating power source, and at the time of shifting to the standby mode, a voltage of the second operating power source is lowered to a voltage close to a lower limit of a common range of a voltage allowable range of the microcomputer and a voltage allowable range of the light receiving unit.

That is, power consumption of the light receiving unit in the standby mode reduces according to a ratio at which at least a voltage of the second operating power source lowers. Therefore, power consumption as to an apparatus in the standby mode reduces further by the amount in which the power consumption of the light receiving unit reduces.

According to one aspect of the invention, at the time of shifting to a standby mode, a voltage of a second operating power source which is an operating power source of a microcomputer and a light receiving unit is lowered to a voltage which is lower than a voltage in an operating mode and is close to a lower limit of a common range of a voltage allowable range of the operating power source of the microcomputer and a voltage allowable range of the operating power source of the light receiving unit. As a result of this, power consumption of the light receiving unit and power consumption of the microcomputer in the standby mode reduce according to a ratio at which at least a voltage of the second operating power source lowers Therefore, power consumption as to an apparatus in the standby mode reduces by the amount in which the power consumption of the light receiving unit and the power consumption of the microcomputer reduce, so that the power consumption as to the apparatus in the standby mode can be reduced at a high ratio.

According to another aspect of the invention, at the time of shifting to a standby mode, a voltage of a second operating power source which is an operating power source of a microcomputer is lowered to a voltage which is lower than a voltage in an operating mode and is close to a lower limit of a voltage allowable range of the operating power source of the microcomputer. As a result of this, power consumption of the microcomputer in the standby mode reduces according to a ratio at which at least a voltage of the second operating power source lowers. Therefore, power consumption as to an apparatus in the standby mode reduces, so that the power consumption as to the apparatus in the standby mode can be reduced.

Furthermore, at the time of shifting to a standby mode, a voltage of a second operating power source also supplied to a light receiving unit is lowered to a voltage close to a lower limit of a common range of a voltage allowable range of the microcomputer and a voltage allowable range of the light receiving unit. As a result of this, power consumption of the light receiving unit in the standby mode reduces according to a ratio at which at least a voltage of the second operating power source lowers. Therefore, power consumption as to an apparatus in the standby mode reduces further by the amount in which the power consumption of the light receiving unit reduce, so that the power consumption as to the apparatus in the standby mode can be reduced further.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Figure 1:
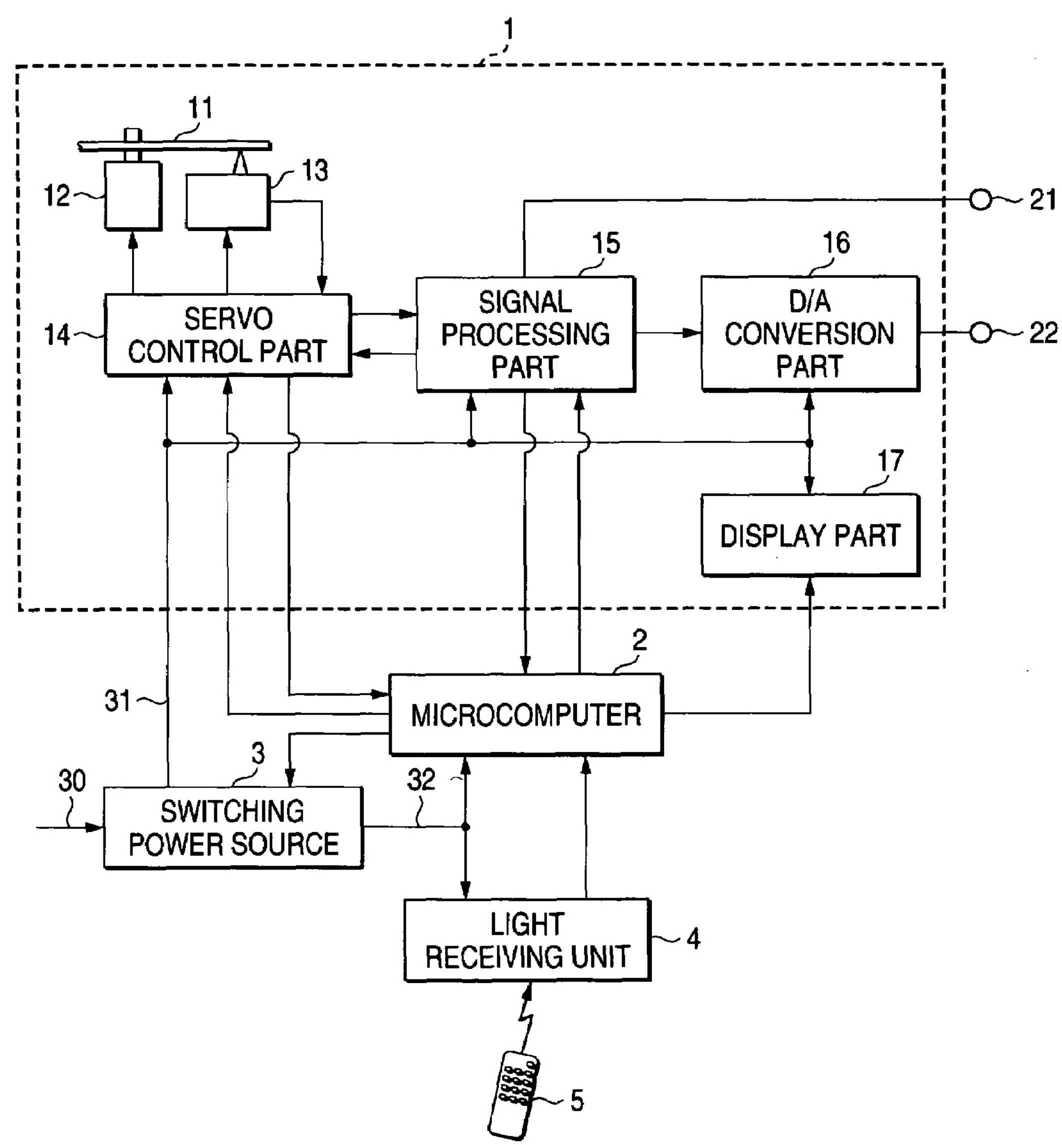
FIG. 1 is a block diagram showing an electrical configuration of a disk reproducing apparatus which is one embodiment of an electronic apparatus according to the invention.

Embodiments of the invention will be described below with reference to the drawing.

First Embodiment

FIG. 1 is a block diagram showing an electrical configuration of a disk reproducing apparatus (specifically, a DVD reproducing apparatus) which is a first embodiment of an electronic apparatus according to the invention, and broadly includes a disk reproducing part 1, a microcomputer 2, a switching power source 3, a light receiving unit 4 and a remote controller 5.

In the drawing, the disk reproducing part (main circuit part) 1 performs a predetermined operation as the DVD reproducing apparatus, that is, reproduces a DVD 11 and also outputs an analog video signal obtained by reproduction to a video terminal 21 and outputs an analog audio signal obtained by reproduction to an audio terminal 22. For this purpose, there are provided a spindle motor 12 for rotating and driving the DVD 11, a pickup 13 for reading a signal recorded on the DVD 11 rotated and driven, a servo control part 14, a signal processing part 15, a D/A conversion part 16, and a display part 17.

The servo control part 14 includes an RF signal processing circuit in the inside, and generates a tracking error signal and a focus error signal from an output of the pickup 13. Then, servo control of focusing of the pickup 13 is performed based on the focus error signal generated. Also, servo control of tracking of the pickup 13 is performed based on the tracking error signal generated.

Also, an RF signal is generated and is outputted to the signal processing part 15. Also, in the signal processing part 15, servo control of a rotational speed of the spindle motor 12 is performed based on a clock signal reproduced from the RF signal. Also, an analog signal (such as a focus error signal or a tracking error signal) related to servo control is outputted to the microcomputer 2.

The signal processing part 15 generates a clock signal acting as reference of reproduction from the RF signal outputted from the servo control part 14 and also fetches digital data from the RF signal. Then, after demodulating the digital data fetched, a data stream is reproduced by making an error correction.

Subsequently, after expanding a program stream among the data stream, an analog video signal is reproduced by making D/A conversion and is outputted to the video terminal 21. Also, a digital audio signal obtained by expanding an audio stream is outputted to the D/A conversion part 16. Also, a clock signal acting as reference generated is outputted to the servo control part 14. Also, various information about reproduction of the DVD 11 is outputted to the microcomputer 2.

The D/A conversion part 16 converts the digital audio signal outputted from the signal processing part 15 into an analog audio signal, and outputs the signal to the audio terminal 22. The display part 17 displays chapter information or time information indicating a reproduction position of the DVD 11 according to data sent out of the microcomputer 2.

The light receiving unit 4 receives an infrared signal sent from the remote controller 5 and also outputs data indicated by the received infrared signal to the microcomputer 2. The switching power source 3 generates and outputs a first operating power source 31 required by the disk reproducing part 1 using a power source 30 as a primary side power source. Also, a second operating power source 32 required by the microcomputer 2 or the light receiving unit 4 is generated and outputted.

The microcomputer 2 controls a main operation as to the DVD reproducing apparatus. That is, the pickup 13 is moved in a predetermined position by controlling the servo control part 14 in the disk reproducing part 1. Also, an operation of the signal processing part 15 is controlled based on various information outputted from the signal processing part 15. Also, data for display is outputted to the display part 17.

The first operating power source 31 and the second operating power source 32 will be described below.

The servo control part 14 and the signal processing part 15 in the disk reproducing part 1 operate using a DC output of 5 V as an operating power source. Because of this, the DC output of 5 V is included in the first operating power source 31. Also, other DC outputs required by the disk reproducing part 1, for example, a DC output for an analog signal required by the D/A conversion part 16 or a DC output of a minus voltage required by the display part 17 are included in the first operating power source 31. That is, the first operating power source 31 becomes a generic designation of plural kinds of DC outputs.

An element in which a voltage allowable range as to an operating power source is 3.0 V to 5.5 V is used in the microcomputer 2. On the other hand, the servo control part 14 and the signal processing part 15 are formed in a circuit in which a voltage of the operating power source is a 5 V system, so that a signal of the 5 V system is used in data communication with the microcomputer 2. As a result of this, when control of the servo control part 14 and the signal processing part 15 is required, a DC output of 5 V is supplied to the microcomputer 2 as the second operating power source 32.

On the other hand, in the case of shifting to a standby mode which is a power-off state in a state of supplying the power source (primary side power source) 30, that is, in the case that it is unnecessary for the microcomputer 2 to perform control of the servo control part 14 and the signal processing part 15, a voltage of the second operating power source 32 is set to 3.3 V which is a voltage close to a lower limit of the voltage allowable range of the microcomputer 2.

Also, a unit in which a voltage allowable range as to an operating power source is 3.0 V to 5.5 V is used in the light receiving unit 4. Then, when a voltage of the second operating power source 32 supplied to the microcomputer 2 becomes 5 V, it is necessary to use a signal of a 5 V system in order to output data to the microcomputer 2. Also, when a voltage of the second operating power source 32 supplied to the microcomputer 2 becomes 3.3 V, it is necessary to use a signal of a 3.3 V system in order to output data to the microcomputer 2. As a result of this, it is constructed so that the second operating power source 32 is supplied to the light receiving unit 4 as the operating power source.

That is, it is constructed so that at the time of shifting to the standby mode, a voltage of the second operating power source 32 is lowered to a voltage close to a lower limit of a common range of the voltage allowable range of the microcomputer 2 and the voltage allowable range of the light receiving unit 4.

In the first embodiment of the invention, it is not limited that the voltage of the second operating power source 32 is lowered to the close to the lower limit of the common range of the voltage allowable range of the microcomputer 2 and the voltage allowable range of the light receiving unit 4. The voltage of the second operating power source 32 in the standby mode may be lowered to a voltage close to at least one lower limit of a voltage allowable range of the microcomputer 2 and lower limit of a voltage allowable range of the light receiving unit 4.

Incidentally, the switching power source 3 switches between a state (state corresponding to an operating mode) in which each of the plural DC outputs forming the first operating power source 31 is set to a predetermined voltage according to a control signal sent out of the microcomputer 2 and a voltage of the second operating power source 32 is set to 5 V and a state (state corresponding to a standby mode) in which all the plural DC outputs forming the first operating power source 31 are set to 0 V (outputs of the first operating power source 31 are stopped) and a voltage of the second operating power source 32 is set to 3.3 V. Also, a method for switching a voltage division ratio in the case of dividing a DC output of a detection target of a voltage error is used as means for switching the voltage of the second operating power source 32 from 5 V to 3.3 V.

That is, it is constructed so that when the second operating power source 32 is viewed from the side of the power source 30, conversion efficiency of the switching power source 3 at the time of setting a voltage of the second operating power source 32 to 3.3 V is maintained at conversion efficiency substantially equal to conversion efficiency of the switching power source 3 at the time of setting a voltage of the second operating power source 32 to 5 V.

An operation of the first embodiment configured as mentioned above will be described.

Now, it is assumed that it is in a state of an operating mode. That is, it is assumed that the switching power source 3 performs switching so that each of the DC outputs forming the first operating power source 31 becomes a predetermined voltage and a voltage of the second operating power source 32 becomes 5 V. Therefore, the microcomputer 2 can control an operation of the servo control part 14 or the signal processing part 15 by a signal of a 5 V system.

When instructions of reproduction are inputted from the remote controller 5 in this state, the microcomputer 2 performs reproduction of the DVD 11 by controlling the servo control part 14 and the signal processing part 15. As a result of that, an analog video signal reproduced is outputted from the video terminal 21, and an analog audio signal reproduced is outputted from the audio terminal 22.

Then, when a power source key (not shown) of the remote controller 5 is manipulated since reproduction of the DVD 11 is ended, the microcomputer 2 performs control of changing an operating state of the switching power source 3 from a state corresponding to the operating mode to a state corresponding to a standby mode. Therefore, all the DC outputs forming the first operating power source 31 become 0 V and power consumption of the disk reproducing part 1 becomes 0. Also, a voltage of the second operating power source 32 becomes 3.3 V.

In the case of shifting to the standby mode described above, power consumed by the microcomputer 2 and the light receiving unit 4 is reduced to about 66% (3.3/5.0) as compared with the case that a voltage of the second operating power source 32 is 5 V even when it is considered that a value of current flowing through the microcomputer 2 and a value of current flowing through the light receiving unit 4 are equal to those of the case that a voltage of the second operating power source 32 is 5 V. Therefore, power consumption in the standby mode at the time of being viewed from the side of the power source 30 is similarly reduced to about 66% (an improvement rate becomes 34%).

Incidentally, in the case of setting a voltage of the second operating power source 32 to 3.3 V, a current flowing through the microcomputer 2 and the light receiving unit 4 generally becomes smaller as compared with the case that the voltage is 5 V. Therefore, power consumption in the case of lowering the voltage of the second operating power source 32 from 5 V to 3.3 V becomes a value (for example, 60%) smaller than 66% of power consumption in the case that the voltage is 5 V. Accordingly, an improvement rate exceeding 34% substantially can be obtained.

In the standby mode, the light receiving unit 4 and the microcomputer 2 are maintained in an operable state. Therefore, when a power source key of the remote controller 5 is manipulated, the microcomputer 2 is notified of this manipulation. As a result of that, the microcomputer 2 shifts a state of the switching power source 3 from a state corresponding to the standby mode to a state corresponding to the operating mode. That is, each of the DC outputs forming the first operating power source 31 becomes a predetermined voltage and a voltage of the second operating power source 32 becomes 5 V. Therefore, it is constructed so that the microcomputer 2 can control an operation of the servo control part 14 or the signal processing part 15 by a signal of a 5 V system.

Second Embodiment

Next, a second embodiment of the invention will be described.

The second embodiment has the same configuration as that shown in FIG. 1 in the case of being shown as an electrical configuration. Also, respective functions of a servo control part 14, a signal processing part 15, a D/A conversion part 16, a display part 17, a microcomputer 2 and a light receiving unit 4 are the same as those of the first embodiment. However, a voltage of an operating power source of the servo control part 14 and the signal processing part 15 in a disk reproducing part 1 is changed from 5 V to 3.3 V.

Because of this, a DC output of 3.3 V is included in a first operating power source 31. Also, other DC outputs required by the disk reproducing part 1, for example, a DC output for an analog signal required by the D/A conversion part 16 or a DC output of a minus voltage required by the display part 17 are included in the first operating power source 31. That is, the first operating power source 31 becomes a generic designation of plural kinds of DC outputs in a manner similar to the first embodiment.

An element in which a voltage allowable range as to an operating power source is 3.0 V to 3.6 V is used in the microcomputer 2. Also, a unit in which a voltage allowable range as to an operating power source is 3.0 V to 3.6 V is used in the light receiving unit 4. As a result of this, when control of the servo control part 14 and the signal processing part 15 is required, a DC output of 3.3 V is supplied to the microcomputer 2 as a second operating power source 32 (in this case, the second operating power source 32 of 3.3 V is also supplied to the light receiving unit 4).

On the other hand, in the case of shifting to a standby mode which is a power-off state in a state of supplying a power source 30, that is, in the case that it is unnecessary for the microcomputer 2 to perform control of the servo control part 14 and the signal processing part 15, a voltage of the second operating power source 32 is set to 3.05 V which is a voltage close to a lower limit of a common range (3.0 V to 3.6 V) of the voltage allowable range of the microcomputer 2 and the voltage allowable range of the light receiving unit 4. Therefore, in the case of shifting to an operating mode, the second operating power source 32 of 3.3 V is supplied to the microcomputer 2 and the light receiving unit 4 and in the case of shifting to the standby mode, the second operating power source 32 of 3.05 V is supplied to the microcomputer 2 and the light receiving unit 4.

In the second embodiment of the invention, it is not limited that the voltage of the second operating power source 32 is lowered to the close to the lower limit of the common range of the voltage allowable range of the microcomputer 2 and the voltage allowable range of the light receiving unit 4. The voltage of the second operating power source 32 in the standby mode may be lowered to a voltage close to at least one lower limit of a voltage allowable range of the microcomputer 2 and lower limit of a voltage allowable range of the light receiving unit 4.

As a result of that, power consumed by the microcomputer 2 and the light receiving unit 4 at the time of shifting to the standby mode becomes about 90% even when it is considered that a current value does not change as compared with the case that a voltage of the second operating power source 32 does not change from 3.3 V at the time of shifting to the standby mode, and an improvement effect exceeding 10% substantially can be obtained.

Incidentally, at the time of shifting to the standby mode, a margin of the voltage of the second operating power source 32 becomes small (0.05 V). However, at the time of the standby mode, a situation in which a load of a switching power source 3 largely changes, for example, driving of a spindle motor 12 does not occur, so that the margin of 0.05V becomes a sufficient value and occurrence of a malfunction caused by the case that the voltage of the second operating power source 32 exceeds a voltage allowable range is prevented.

Incidentally, the invention is not limited to the embodiments described above, and can similarly be applied to any other electronic apparatus (for example, a television receiver, a videocassette recorder, etc.) using a microcomputer 2 as control means.

Also, the case of using the power source 30 as the primary side power source has been described, but it can similarly be applied to the case of an apparatus using a battery etc. as the primary side power source.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A disk reproducing apparatus comprising:

a switch to which a commercial power source is supplied, the switch operable to generate a first power and a second power based on the commercial power source;

a reproducer operable to reproduce an optical disk in an operating mode;

a microcomputer operable to control the reproducer and the switch; and a receiver operable to receive an infrared signal transmitted from a remote controller and outputs data based on the received infrared signal to the microcomputer so as to control the switch, wherein:

in the operating mode, the microcomputer makes the switch to supply the first power to the reproducer and to supply the second power to the microcomputer and the receiver;

in a standby mode, the microcomputer makes the switch to stop supplying the first power to the reproducer and to supply the second power to the microcomputer and the receiver so as to reduce a load fluctuation of the switch;

a voltage of the second power in the standby mode is lower than a voltage of the second power in the operating mode; and the voltage of the second power in the standby mode is in the vicinity of a lower limit in a common range of an operating voltage range of the microcomputer and an operating voltage range of the receiver.

2. An electronic apparatus comprising:

a switch to which a power source is supplied, the switch operable to generate a first power and a second power based on the power source;

a main circuit part operable to perform a predetermined operation in an operating mode; and a microcomputer operable to control the main circuit part and the switch wherein:

in the operating mode, the microcomputer makes the switch to supply the first power to the main circuit unit and to supply the second power to the microcomputer;

in a standby mode, the microcomputer makes the switch to stop supplying the first power to the main circuit unit and to supply the second power to the microcomputer so as to reduce a load fluctuation of the switch;

a voltage of the second power in the standby mode is lower than a voltage of the second power in the operating mode; and the voltage of the second power in the standby mode is in the vicinity of a lower limit in an operating voltage range of the microcomputer.

3. The electronic apparatus according to claim 2, further comprising:

a receiver operable to receive an infrared signal transmitted from a remote controller and outputs data based on the received infrared signal to the microcomputer so as to control the switch, wherein:

in the operating mode and in the standby mode, the microcomputer makes the switch to supply the second power to the receiver; and a voltage of the second power in the standby mode is in the vicinity of a lower limit in a common range of the operating voltage range of the microcomputer and an operating voltage range of the receiver.

4. The electronic apparatus according to claim 2, further comprising:

a receiver operable to receive an infrared signal transmitted from a remote controller and outputs data based on the received infrared signal to the microcomputer so as to control the switch, wherein:

in the operating mode and in the standby mode, the microcomputer makes the switch to supply the second power to the receiver; and a voltage of the second power in the standby mode is in the vicinity of at least one lower limit of the operating voltage range of the microcomputer and an operating voltage range of the receiver.

* * * * *